United States Patent
Khan et al.

(10) Patent No.: US 8,789,441 B2
(45) Date of Patent: Jul. 29, 2014

(54) PEDAL FEEL SIMULATION SYSTEM

(75) Inventors: Adil Khan, Windsor (CA); Dan Gabor, Canton, MI (US); Mark Muddiman, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/415,865

(22) Filed: Mar. 9, 2012

(65) Prior Publication Data

US 2013/0233118 A1   Sep. 12, 2013

(51) Int. Cl.
*G05G 1/30* (2008.04)

(52) U.S. Cl.
USPC ............................................................ 74/512

(58) Field of Classification Search
USPC ........................................... 74/512, 513, 514
See application file for complete search history.

(56) References Cited

U.S. PATENT DOCUMENTS

| | | | | |
|---|---|---|---|---|
| 5,934,152 A | * | 8/1999 | Aschoff et al. | 74/513 |
| 6,289,762 B1 | * | 9/2001 | Silva | 74/513 |
| 6,361,122 B2 | * | 3/2002 | Anderson et al. | 303/3 |
| 2005/0082909 A1 | * | 4/2005 | Constantakis et al. | 303/20 |
| 2010/0148571 A1 | * | 6/2010 | Kim | 303/16 |
| 2011/0041647 A1 | * | 2/2011 | Soltys | 74/560 |
| 2011/0146395 A1 | * | 6/2011 | Vollert et al. | 73/132 |

* cited by examiner

*Primary Examiner* — Vicky Johnson
(74) *Attorney, Agent, or Firm* — Joseph E. Root

(57) ABSTRACT

A system and method for simulating pedal feel. The system includes a brake pedal having a support, a brake pedal arm pivotably attached at a pivot connection to the support, and a torsion spring mounted at the brake pedal arm pivot connection. In addition, a compression spring, spaced apart from the pivot connection, is connected to the support and to the brake pedal.

11 Claims, 6 Drawing Sheets

PEDAL FEEL SIMULATION SYSTEM

BACKGROUND

This application relates generally to the field of braking systems in vehicles and more particularly to brake simulators.

Electronic brake systems, such as "brake by wire" systems, are increasingly being integrated into or replacing conventional hydraulic brake systems of vehicles. Brake-by-wire braking systems typically replace the traditional mechanical and hydraulic fluid connection between a brake pedal and braking units (such as disc or drum brakes) with an electrical connection, making hydraulic units function as secondary or back-up units. The electrical connection communicates a driver's brake inputs to a control unit, which in turn applies or releases a braking force. In mechanical or hydraulic systems, when a driver applied brakes, she feels a reactive force corresponding to the applied force. The driver correlates this reactive force to the degree of braking required.

In electronic systems, the control unit generates the braking signal, and such systems exclude any mechanical connection between the brake pedal and a booster. In some instances, the driver may not detect any countering force from the electronic brake system, which in turn can disorient the driver. The pedal may move without any reaction force, referred to as "pedal feel".

Accordingly, there exists a need to provide a brake pedal feel simulator, which provides appropriate pedal feel to brake pedal based on the braking force.

SUMMARY

One embodiment of the present application describes a brake pedal having a support, and a brake pedal arm pivotably attached at a pivot connection to the support. A torsion spring is mounted at the brake pedal arm pivot connection. The torsion spring extending between the brake pedal arm and the support. In addition, a compression spring, spaced apart from the pivot connection, is connected to the support and to the brake pedal. The compression spring includes a rubber puck.

Another embodiment of the present application discloses a brake pedal having a support and a brake pedal arm pivotably attached at a pivot connection to the support. A torsion spring, mounted at the brake pedal arm pivot connection, extends between the brake pedal arm and the support. The brake pedal further includes a first compression spring and a second compression spring. Each of the compression spring is attached to at least one of the brake pedal arm or the support at a location spaced apart from the pivot connection. Further, the second compression spring is pre-loaded to a predetermined value.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

In general, the present disclosure describes methods and systems for brake pedal feel simulation. To this end, some embodiments of the present disclosure employ a rubber puck that provides a feedback force to the brake pedal based on the applied braking force. Particularly, the present disclosure employs two design techniques to simulate pedal feel—single-puck design and dual-puck design.

In single-puck implementations, a rubber puck enclosed in a cup-shaped member is mounted on a brake bracket, and a pivoted flat disc mounted on the pedal compresses the rubber puck when a driver applies brake. The rubber puck responds to this braking force by applying a simulation force on the pedal. Using this arrangement, the rubber puck provides a progressive feedback force to the applied braking force.

In dual-puck implementations, two rubber pucks, each mounted on either the pedal or the brake bracket, are employed. A braking force on the pedal activates one of the rubber pucks. The second rubber puck is pre-loaded with a predefined load such that the second puck gets activated only when the first rubber puck achieves the pre-load value. Subsequently, the second rubber puck is deformed, but at a lower spring rate. Using the dual-puck design, the overall spring rate decreases, which in turn reduces the subsequent increase in the simulation force with increasing braking force.

Exemplary Embodiments

Figure 1A:
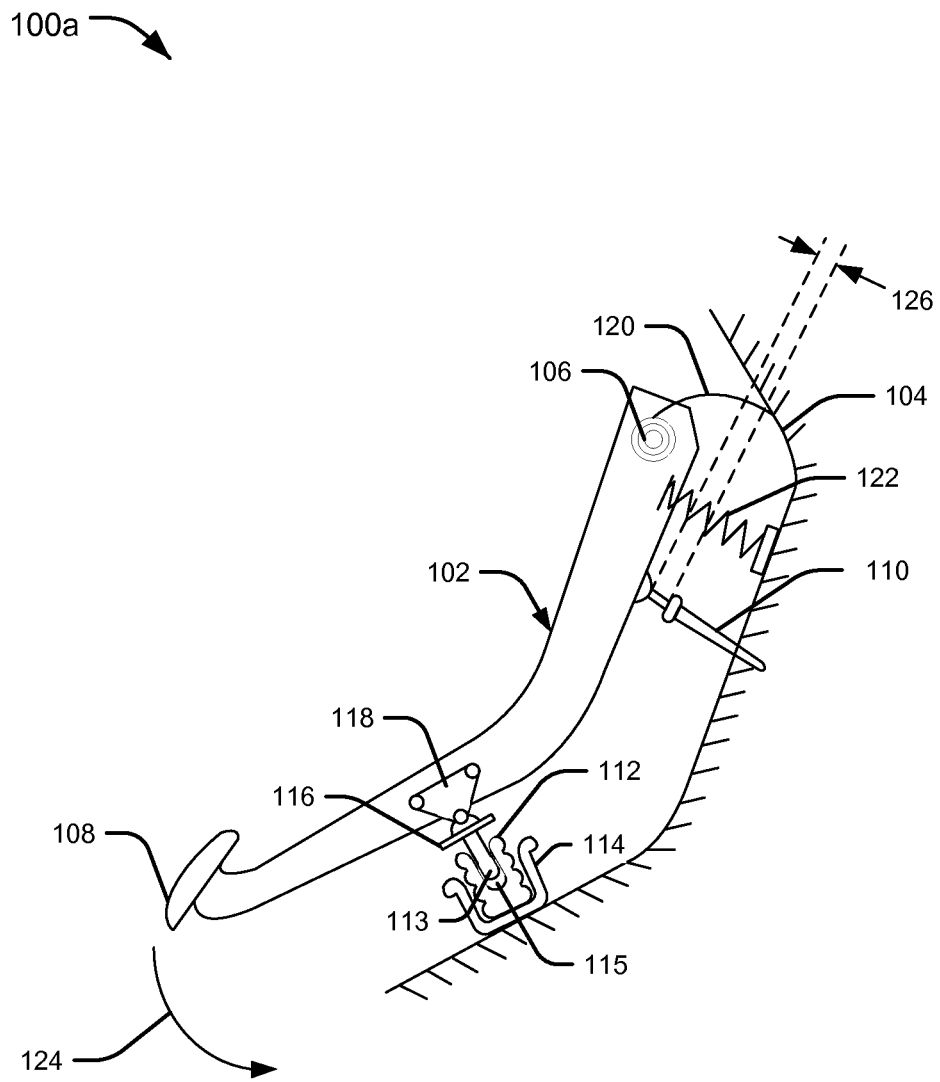
FIG. 1A is an exemplary embodiment of a braking system employing a single-rubber puck design according to an embodiment of the present disclosure.

FIG. 1A schematically depicts an electronic braking system 100a for a vehicle. Braking system 100a generally includes a brake pedal, the brake pedal including a brake pedal arm 102 mounted on a support, also referred to as brake pedal bracket 104, adapted to be fixed onto a motor vehicle (not shown). Brake pedal arm 102 is pivotally attached to the brake pedal bracket 104 so that the brake pedal arm 102 can pivot about a pivot point 106. The braking system 100a also includes a pedal plate 108, on the brake pedal arm 102, on which a driver can exert a pedal force. As a reaction to this action force, pedal arm 102 rotates about the point 106, and the pedal plate 108 moves downward. A pedal angle sensor (not shown) mounted on the pedal bracket 104 with a linkage to the pedal arm 102 gives the signal out to a brake module to operate an electric brake system. These brake components are known to those skilled in the art and will not be discussed in further detail.

As the pedal arm 102 is actuated, the driver experiences a force feedback referred to as "Pedal feel." In general, pedal feel is determined by the interrelationship between the variables of pedal travel and pedal force. A booster in a hydraulic braking system provides some feedback or brake feel to a driver. The pushrod 110, physically disconnected from the pedal arm 102, may not provide an appropriate pedal feel due to a Regen gap 126 existing between the pedal arm and the pushrod 110. The gap 126 provided enables regenerative braking to be applied before the pushrod 110 activates the back-up braking system i.e. the hydraulic booster braking system. The embodiments of the present disclosure describe a braking system that includes a simulation mechanism to provide the desired pedal feel to the driver.

Figure 4:
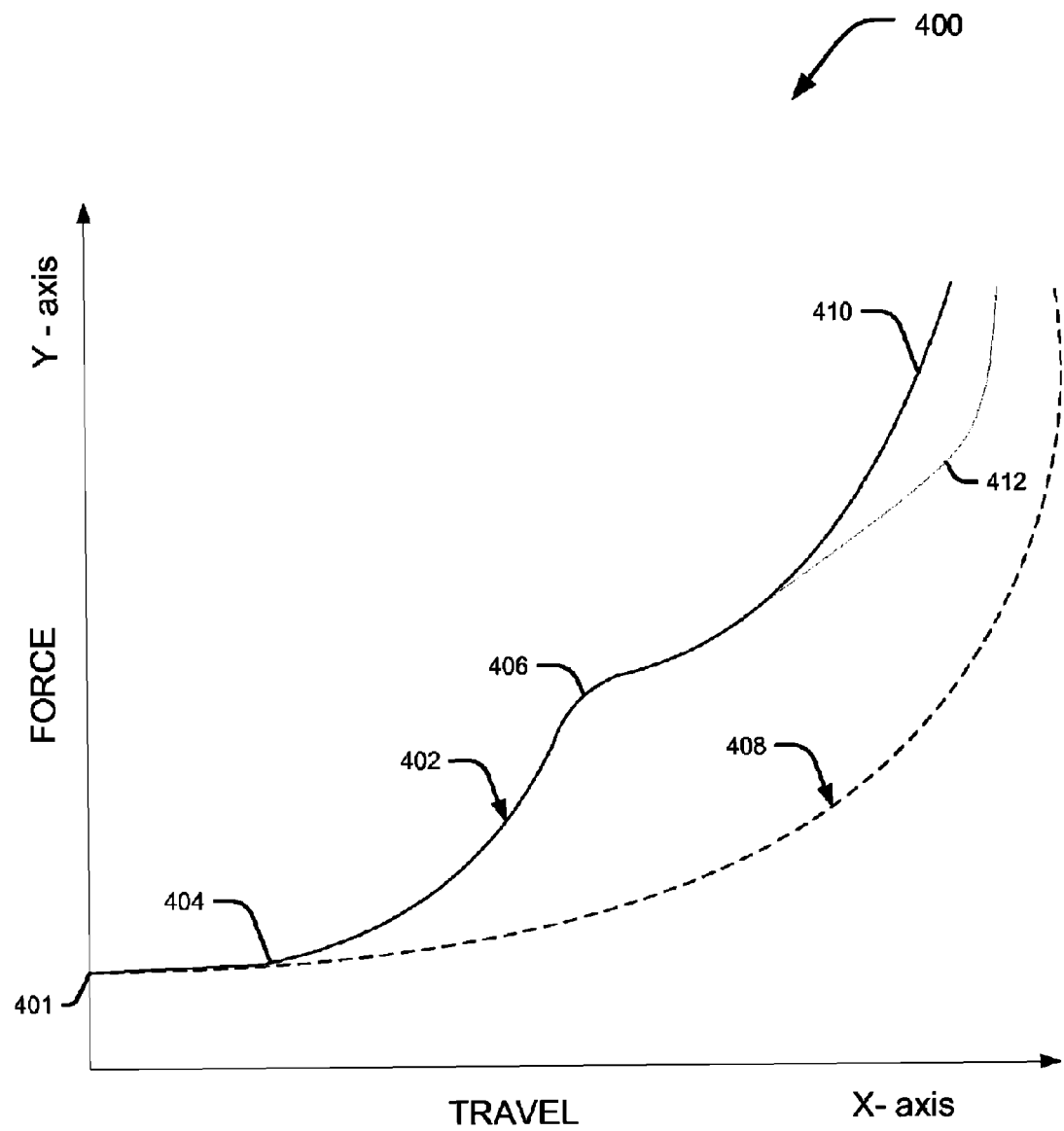
FIG. 4 is a graph depicting force travel characteristics of the braking system, shown in FIG. 3.

For pedal feel simulation, the illustrated embodiment employs a rubber puck 112 enclosed in a cup shaped member, referred to as a cup 114. As shown, the rubber puck 112 and the cup 114 are mounted on the pedal bracket 104, the mounting being optionally enabled to pivot as well. A flat disc 116 is pivoted on a fixed bracket 118 that connects the flat disc 116 to the pedal arm 102 such that the flat surface of the flat disc 116 stands perpendicular to the central axis of the rubber puck 112. A pin 113, connected to the brake pedal arm and configured below the flat disc 116 as shown, is adapted for an easy access through an opening, also referred as a hole 115 in the rubber puck 112. More particularly, the entering pin 113 is configured to guide the rubber puck 112, and avoid buckling as well. The hole 115 and the pin 113 can be sized and designed to provide additional hysteresis to a corresponding force travel curve. In addition, a torsion spring 120 is mounted on the pedal arm 102 at the point 106, and/or a hinged compression spring 122 is mounted under the pedal arm 102, extends and connects to the brake pedal bracket 104. These springs provide the flat portion of the force travel curve (as shown in FIG. 4, point 401 to point 404), and are also required for the ability of the pedal arm 102 to return. Such springs are known to those skilled in the art and will not be discussed in detail. In an embodiment, the rubber puck 112 may be pivotally mounted on the flat disc 116, while the cup remains on the pedal bracket 104.

Rubber puck 112 is a resilient member, and thus may be a compression steel spring, adapted to deform or compress under force. The puck may be made from natural rubber, MCU (micro cellular polyurethane), or may range from a coil spring to a disc spring as well. The configuration and dimensions of the rubber puck 112 may vary, as desired. For example, rubber puck may assume a cylindrical, rectangular, or an irregular shape. In the illustrate embodiment, rubber puck 112 is a helical shaped elongate device. Being connected to the brake pedal bracket 104 and to the brake pedal arm 102, and spaced apart from the pivot point 106, the rubber puck 112 may have a spring rate that may vary based on the required stiffness. More particularly, the spring rate may vary depending upon the position of the rubber puck 112, as well as the desired force travel curve. Further, depending upon the position of the rubber puck 112, placed between the pivot point 106 and the flat disc 116, spring stiffness can be calculated from the desired force travel curve. In addition, the spring rate may be constant or varying, as required. In other embodiments, various known resilient devices, such as a spring or microcellular polyurethane, may suitably replace the rubber puck 112.

The cup 114 is generally a cylindrical structure with an open top for receiving the rubber puck 112. The dimensions of the cup 114 may vary based on that of the rubber puck 112. Suitable material for manufacturing this member may include, but not limited to, metals such as stainless steel, plastic, or polymer. In addition, the rubber puck 112 can be mounted in the cup 114 with the use of an adhesive or via a snap in feature (shown in FIGS. 2A and 2B), either on the puck or through a pin welded or screwed in the cup.

As shown, flat disc 116 is a circular disc that presses onto the rubber puck 112 upon braking force exertion. It should be understood that flat disc 116 may be any structure, with a uniform surface, facing the rubber puck 112 to apply uniform force. The surface can also be made spherical or wavy to improve the transition into the rubber puck 112. A small disc made of MCU may also be placed into the flat disc 116. The fixed bracket 118 is attached to the pedal arm 102 through fasteners, rivets, or welds. The flat disc 116 may be permanently or detachably connected to the pedal arm 102.

In use, when a driver applies braking force, depicted by an arrow 124, onto the pedal plate 108, the pedal arm 102 moves in the direction of force. This force enables the pin 113 to enter the rubber puck 112, guiding the pedal travel and avoiding buckling of the rubber puck 112. Subsequently, the force presses the flat disc 116 onto the rubber puck 112, which compresses within the cup 114. The rubber puck 112 responds to the braking force with a feedback force, also referred to as simulation force, on the pedal arm 102. As the braking force increases, the feedback force also increases progressively. As a result, the driver experiences pedal feel.

When the rubber puck 112 is compressed it binds against the pin 113, and during release it releases the pin 113 slowly thus providing hysteresis. There may be a gap maintained between the rubber puck 112 and the flat disc 116 (depending on the required force travel curve). Until this gap is closed during a pedal application, the force feedback comes either from the torsion spring 120 or from the compression spring 122. This force feedback is linear as compared to compressing the rubber puck 112 directly. The shape of the rubber puck 112 is designed for enabling a smooth entry to the pin 113.

Various alternatives to the simulation mechanism may be contemplated. For example, rubber puck 112 may be mounted on the pedal bracket 104 and cup 114 may be mounted on the pedal arm 102. In this embodiment (shown in FIG. 1B), as the pedal arm 102 is pressed, the cup 114 compresses the rubber puck 112, which in turn provides a force feedback. The simulator does not require the flat disc 116 to compress the rubber puck 112. Further, the rubber puck 112 is a step shaped rubber puck. It should be understood that the design and configuration of rubber puck 112 may vary based on the desired force travel characteristics. The step in the illustrated embodiment assists in making the force travel curve more progressive at higher travels. In addition, a pin, similar to the pin 113 could be enabled within the cup 114.

The arrangement of the single-rubber puck design can also be altered or reversed so that the rubber puck 112 is pivotably connected on the pedal arm 102, and the flat disc 116 mounted on the pedal bracket 104. The pin 113, configured on the flat disc 116, would be configured similarly to enter into the hole 115 in the rubber puck 112 to provide hysteresis and to avoid buckling.

Figure 1B:
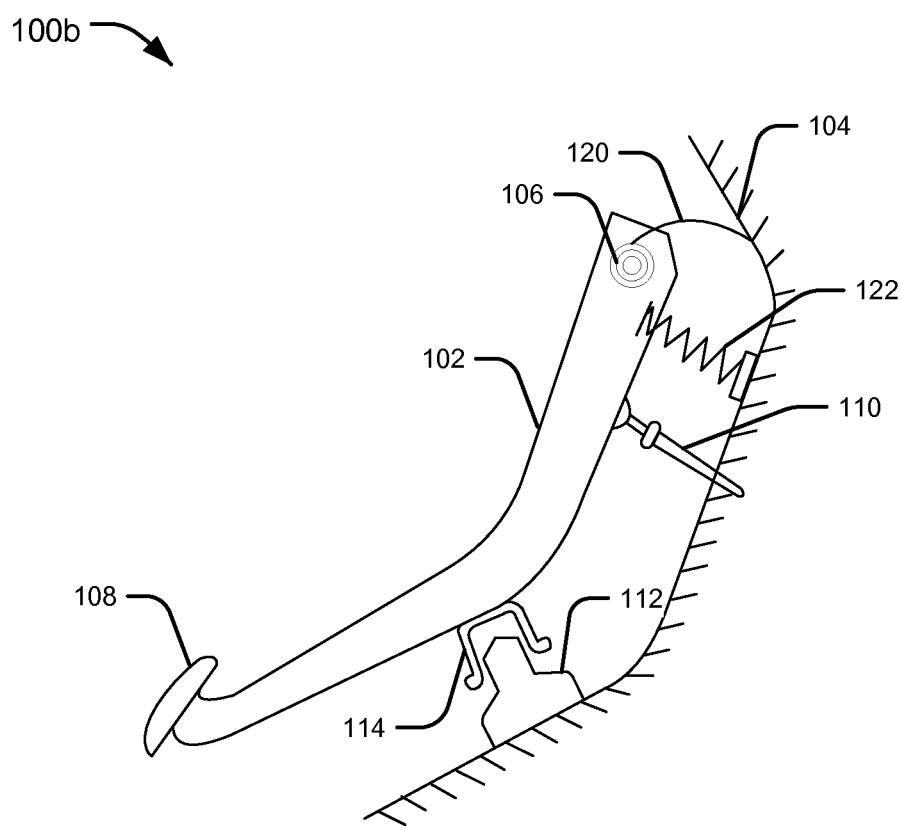
FIG. 1B illustrates an alternate embodiment of the braking system, shown in FIG. 1A.

The simulation mechanism discussed in FIGS. 1A and 1B generally provides a steadily increasing simulation force as the pedal travel increases. It should be understood that the spring rate of the rubber puck 112 affects the relationship between pedal travel and simulation force. In general, the rubber puck 112 includes a constant spring rate. This constant rate may increase the simulation force exponentially with increasing pedal travel. High simulation force, however, may not be desirable.

Figure 2A:
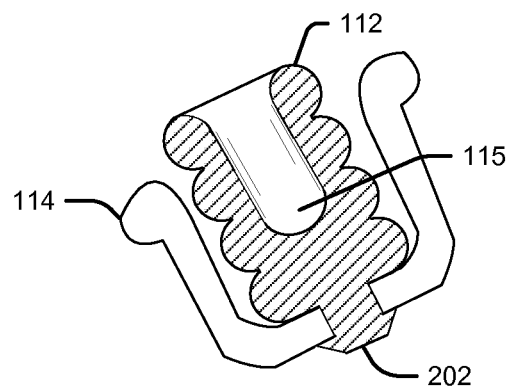
FIG. 2A illustrates an embodiment for attaching the rubber puck to the cup, as shown in FIG. 1A.
Figure 2B:
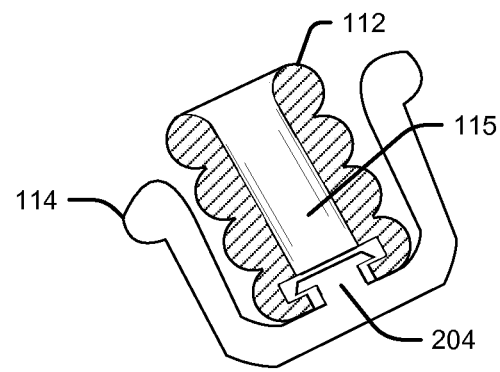
FIG. 2B illustrates another embodiment for attaching the rubber puck to the cup, as shown in FIG. 1A.

FIG. 2A and FIG. 2B depict alternate fastening mechanisms to fasten the rubber puck 112 to the cup 114. Accordingly, snapping members 202 may be configured with the rubber puck 112 as shown in FIG. 2A, or snapping members 204 may be configured with the cup 114 as shown in FIG. 2B. Both the configurations are adapted to fasten the rubber puck 112 to the cup 114.

Figure 3:
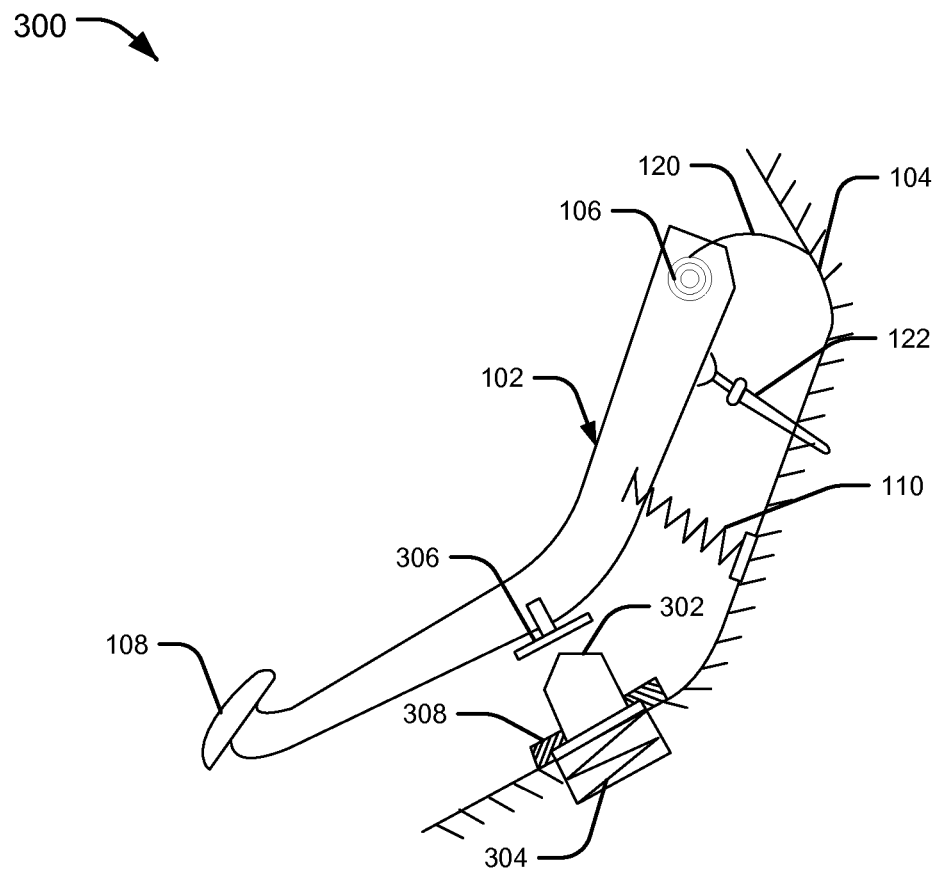
FIG. 3 illustrates an exemplary embodiment of a braking system employing a two-rubber puck design.

To lower the spring rate of the rubber puck 112 with increasing pedal travel, pedal feel simulator may utilize two-puck design. FIG. 3 illustrates an embodiment of a braking system 300 employing two rubber pucks 302 and 304, mounted on the brake pedal bracket 104. As shown, a pivotable plate 306 is mounted on the pedal arm 102, such that the plate 306 stands perpendicular to the axis of the rubber puck 302. In addition, the second rubber puck 304 may be enclosed in the cup 114 either as part of the pedal bracket 104 or a cup mounted onto the pedal bracket 104.

The spring rates of the two rubber pucks 302 and 304 may vary. In general, the second rubber puck's spring rate is set lower than that of the first rubber puck 302. In order to achieve a reduction of higher simulation forces, the second rubber puck 304 is preloaded to a predetermined force level, which is dependent on the pedal feel required at higher simulation force. To this end, the second rubber puck 304 may be a spring-loaded rubber puck or a disc spring, which is held in its compressed position using a fastened block 308. In an embodiment, second rubber puck 304 may be preloaded at a value between 100b to 280N.

When a driver applies braking force, the pedal plate 108 presses the first rubber puck 302 using the plate 306, the plate 306 being mounted above the rubber puck 302. Accordingly, the first rubber puck 302 exerts a simulation force on the pedal plate. Once the braking force exceeds the predetermined force level, the second rubber puck 304 will start engaging. Subsequent increase in the braking force compresses the second rubber puck 304 at a spring rate lower than that of first rubber puck 302. The lower spring rate reduces the amount of deformation with increasing braking force, which in turn decreases the feedback force applied by the second rubber puck 304. Using two rubber pucks, having different spring rates, the overall spring rate of the simulator decreases, as is evident in a graph discussed in the following section.

FIG. 4 illustrates a graph 400 depicting pedal characteristics by a line 402 in a dual-puck design. The X-axis represents pedal travel and the Y-axis depicts the simulation force. The spring rate of dual-rubber puck assembly (defined as the ratio of force to travel) determines the slope of the line 402.

At start point 401, as the pedal arm 102 is depressed, the simulation force is applied and the travel values accordingly vary over a range. Such application of the simulation force remains almost flat and constant over a range of the pedal travel until the point 404. More particularly, the range between the points 401 and 404 depicts the feedback force or the reactive force of the torsion spring 120 and/or the compression spring 122.

At point 404, the simulation force starts increasing as the pedal travel increases further, based on the braking force applied by a driver. At this stage, only the first rubber puck 302 is engaged. At a knee point 406, the first rubber puck 302 achieves a force equivalent to the preload on the second rubber puck 304. Subsequently, the second rubber puck 304 starts deforming at a lower spring rate, curving the line 402 downwardly to represent larger pedal travel per unit force.

The line 402 curving towards point 410 depicts a profile obtained through an arrangement of the second rubber puck 304, resulting in a curve that is more progressive, and undergoing higher values of force depicted on the Y-axis, in relation to values of travel depicted on the X-axis.

Similarly, the line 402 curving towards point 412 depicts a profile obtained through an arrangement of a secondary steel spring or a disc spring, in place of the second rubber puck 304. The rate obtained of the values of the force depicted through the Y-axis in relation to the values of the travel on the X-axis, is more linear.

A profile obtained through a single-puck design is depicted through the curve 408. It will be understood that this curve would not include a knee point, similar to the ones observed in the dual-puck line 402, as only a single-puck is under application.

As shown, the present disclosure reduces the spring rate to decrease the simulation force as compared with a constant rate simulator. It is evident from the slope of the line 402 that the overall spring rate of the braking system 300 decreases by employing two rubber pucks. In an embodiment, the single-rubber puck design discussed in FIGS. 1A and 1B may also limit the simulation force at higher braking force by employing the cup 114 with holes on the bottom face or the cylindrical wall to allow expansion of the rubber puck 112.

Figure 5:
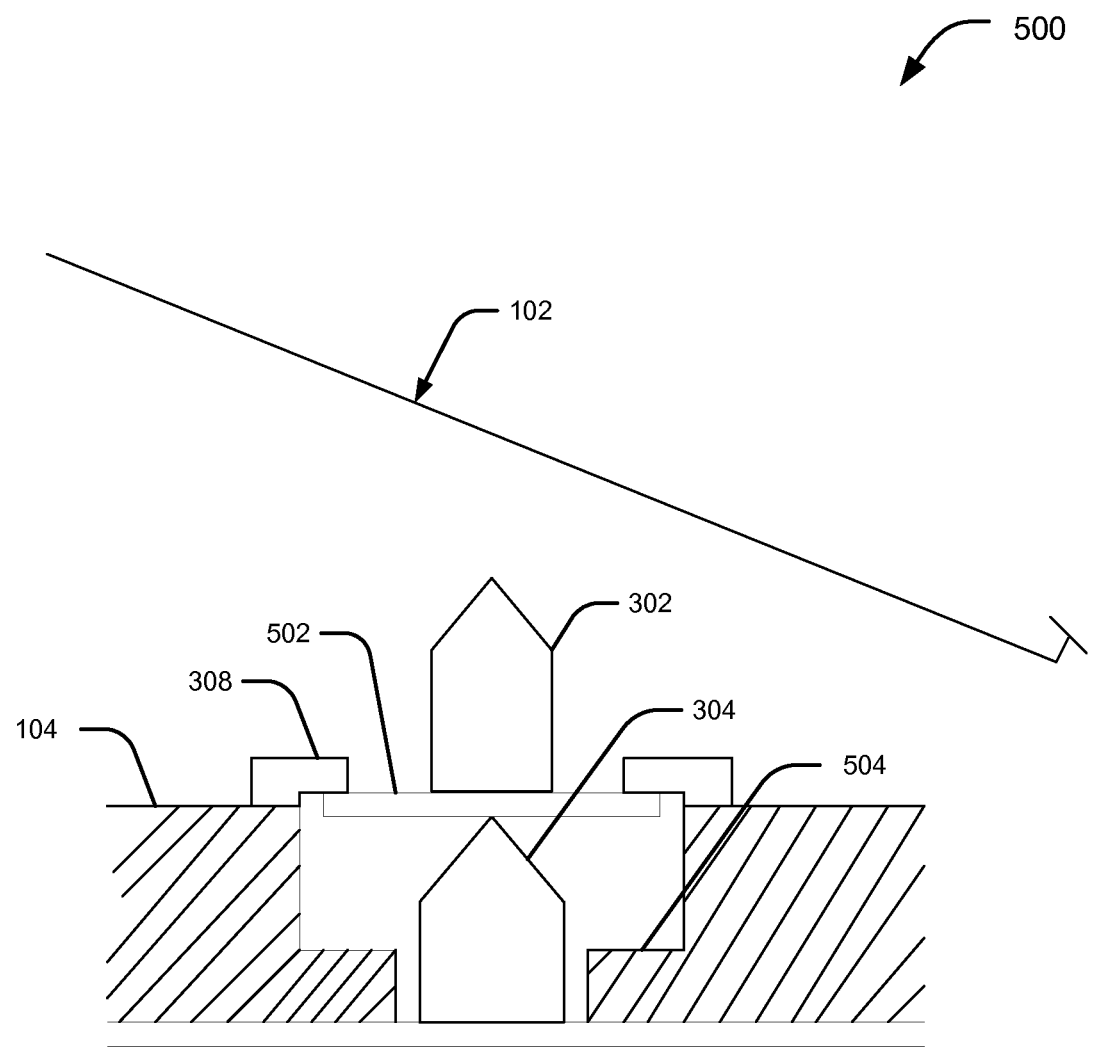
FIG. 5 illustrates an alternate embodiment of the braking system, shown in FIG. 3.

FIG. 5 illustrates an alternate embodiment 500 of the two-rubber puck design. The illustrated embodiment employs a number of components identical to those discussed in connection with FIG. 3, such as rubber pucks 302 and 304, and fastened block 308. Those components are similar in structure and operation to those shown in FIG. 1A. In addition, the illustrated embodiment includes a disc-shaped plate 502 positioned between the two rubber pucks 302 and 304, and this plate pushes the second rubber puck 304 once the first rubber puck achieves the pre-load on the second rubber puck 304.

Moreover, the system includes a step 504 on the brake pedal bracket 104 to limit the compression of second rubber puck 304. It is evident that the plate 502 cannot go lower than the step 504, and once the plate 502 rests on the step 504, subsequent increase in the braking force will result in a more progressive curve, which will be set to the required full pedal travel. Thus, step 504 limits the overall travel indicating full pedal travel or end of travel through the points 410 and 412. Various mechanisms to limit the deformation of the second rubber puck 304 may be employed. For example, the moving plate 502 may itself include limiting features or geometrical structure that restricts the downward movement of the plate.

Various less preferred alternatives of the dual-puck design may be contemplated. For example, instead of rubber pucks, the system may employ springs, a spring and a rubber puck, two microcellular polyurethanes, microcellular polyurethane and a spring, and so on. Further, the second rubber puck 304, pre-loaded to a predetermined value, may be mounted on the pedal arm 102 by connecting the second rubber puck 304 in the form of a spring to the plate 306. In this implementation, the spring-loaded plate 306 first compresses the first rubber puck mounted on the rubber bracket and subsequently, when the braking force exceeds the pre-load on the spring, it compresses the preloaded spring. In an alternate embodiment, the braking system 300 may include both the spring-loaded plate 306 and an additional pre-loaded rubber puck positioned underneath the first rubber puck 302.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

We claim:

1. A brake pedal adapted to be depressed by a user, the brake pedal including:
   a support;
   a brake pedal arm pivotably attached at a pivot connection to the support;

a first resilient member connected to the brake pedal arm or the support at a location spaced apart from the pivot connection, the first resilient member having a first spring rate; and a second resilient member connected to at least one of the support or the brake pedal arm at a location spaced apart from the pivot connection, the second resilient member having a second spring rate, the second spring rate being less than the first spring rate;

wherein angular movement of the brake pedal arm around the pivot connection successively engages the first resilient member and then the second resilient member.

2. The brake pedal of claim 1, wherein the brake pedal further includes a torsion spring mounted at the brake pedal arm pivot connection extending between the brake pedal arm and the support.

3. The brake pedal of claim 2, wherein the second resilient member is being pre-loaded to a predetermined force value.

4. The brake pedal of claim 3, wherein the second resilient member is configured to engage the brake pedal after the braking force on the brake pedal exceeds the pre-determined force value.

5. The brake pedal of claim 1, wherein the first and second resilient members are resilient pucks.

6. The brake pedal of claim 1, wherein the second resilient member is enclosed in a cup-shaped member.

7. The brake pedal of claim 1, wherein the brake pedal arm is connected to a plate mounted above the first resilient member.

8. The brake pedal of claim 7, wherein the plate is spring loaded.

9. The brake pedal of claim 1, wherein the first and the second resilient members are one of:
a rubber puck;
a disc spring; or
micro cellular polyurethane (MCU).

10. The brake pedal of claim 1, wherein the support includes geometrical structure adapted to limit compression of the second resilient member.

11. The brake pedal of claim 1, wherein hysteresis is provided to the brake pedal arm through a pin connected to the brake pedal arm and adapted to enter an opening configured in at least one of the following: the first resilient member; and the second resilient member.

* * * * *